(12) United States Patent
Mutter et al.

(10) Patent No.: US 12,494,940 B2
(45) Date of Patent: Dec. 9, 2025

(54) SUBSCRIBER STATION FOR A SERIAL BUS SYSTEM AND METHOD FOR COMMUNICATION IN A SERIAL BUS SYSTEM

(71) Applicant: Robert Bosch GmbH, Stuttgart (DE)

(72) Inventors: Arthur Mutter, Neuhausen (DE); Florian Hartwich, Reutlingen (DE); Ramona Jung, Stuttgart (DE); Thomas Enderle, Munich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 459 days.

(21) Appl. No.: 17/912,198

(22) PCT Filed: Apr. 21, 2021

(86) PCT No.: PCT/EP2021/060372
§ 371 (c)(1),
(2) Date: Sep. 16, 2022

(87) PCT Pub. No.: WO2021/233634
PCT Pub. Date: Nov. 25, 2021

(65) Prior Publication Data
US 2023/0148180 A1 May 11, 2023

(30) Foreign Application Priority Data

May 22, 2020 (DE) .................. 10 2020 206 412.1

(51) Int. Cl.
*H04L 12/40* (2006.01)
(52) U.S. Cl.
CPC ............ *H04L 12/40032* (2013.01); *H04L 2012/40215* (2013.01)

(58) Field of Classification Search
CPC ...... H04L 12/40032; H04L 2012/40215; H04L 63/10; H04L 2012/40273
See application file for complete search history.

(56) References Cited

U.S. PATENT DOCUMENTS

| | | | | |
|---|---|---|---|---|
| 4,903,280 A | * | 2/1990 | Lang ............ | H04L 25/02 375/220 |
| 2001/0017860 A1 | * | 8/2001 | Hata ............ | H04L 12/40071 370/395.7 |

(Continued)

FOREIGN PATENT DOCUMENTS

| | | |
|---|---|---|
| CN | 107078931 A | 8/2017 |
| CN | 110838960 A | 2/2020 |

(Continued)

OTHER PUBLICATIONS

International Search Report for PCT/EP2021/060372, Issued Jul. 26, 2021.

(Continued)

*Primary Examiner* — Christine Ng
(74) *Attorney, Agent, or Firm* — NORTON ROSE FULBRIGHT US LLP

(57) ABSTRACT

A subscriber station for a serial bus system. The subscriber station includes: a communication control device for controlling a communication of the subscriber station with at least one other subscriber station of the bus system and for generating a transmission signal according to a frame; a transmitting/receiving device which is designed for the serial transmission of the transmission signal generated by the communication control device to a bus of the bus system, and which is designed for the serial reception of signals from the bus; and a marking module for evaluating whether or not a frame received from the bus is permitted to occur on the bus, and for marking a frame with a marking in such a way that the transmitting/receiving device transmits the marking (Continued)

to the bus in order to communicate the result of the evaluation to the at least one other subscriber station.

14 Claims, 4 Drawing Sheets

(56) References Cited

U.S. PATENT DOCUMENTS

| | | | |
|---|---|---|---|
| 2006/0002359 A1* | 1/2006 | Kim | H04L 5/023 |
| | | | 370/343 |
| 2006/0248234 A1* | 11/2006 | Pope | H04L 63/10 |
| | | | 709/250 |
| 2007/0121567 A1* | 5/2007 | Venkatachalam | H04L 5/023 |
| | | | 370/329 |
| 2008/0002713 A1* | 1/2008 | Fujita | H04L 1/0061 |
| | | | 370/395.6 |
| 2009/0164788 A1* | 6/2009 | Cho | H04W 12/041 |
| | | | 713/175 |
| 2017/0279622 A1* | 9/2017 | Yamaguchi | G06F 21/554 |
| 2018/0131522 A1* | 5/2018 | Lawlis | H04L 9/0631 |
| 2018/0139052 A1* | 5/2018 | Matsumoto | H04L 12/40 |
| 2018/0148006 A1* | 5/2018 | Haga | H04L 12/4625 |
| 2018/0219561 A1* | 8/2018 | Litsyn | H03M 13/2915 |
| 2018/0324146 A1* | 11/2018 | Meriac | H04W 4/80 |
| 2018/0367546 A1* | 12/2018 | Miyashita | H04L 12/46 |
| 2022/0086022 A1* | 3/2022 | Ye | H04L 12/40163 |
| 2022/0094540 A1* | 3/2022 | Kurachi | H04L 9/14 |
| 2022/0166705 A1* | 5/2022 | Froese | H04L 45/20 |

FOREIGN PATENT DOCUMENTS

| | | |
|---|---|---|
| EP | 1164751 A2 | 12/2001 |
| EP | 3128699 A1 | 2/2017 |
| EP | 3133774 A1 | 2/2017 |

OTHER PUBLICATIONS

Matsumoto et al., "A Method of Preventing Unauthorized Data Transmission in Controller Area Network," 2012 IEEE 75th Vehicular Technology Conference (VTC Spring), IEEE, 2012, pp. 1-5.

ISO 11898-1:2015 Standard, "Road Vehicles—Controller Area Network (CAN)—Part 1: Data Link Layer and Physical Signalling," 2015, pp. 1-74.

* cited by examiner

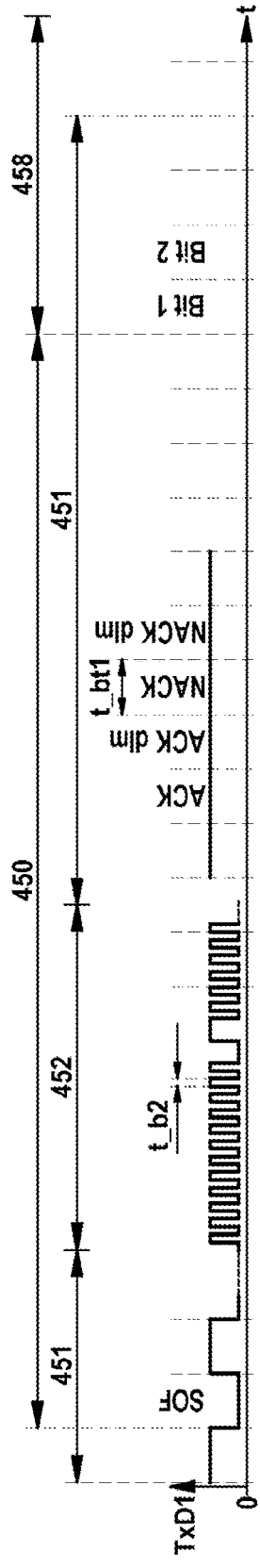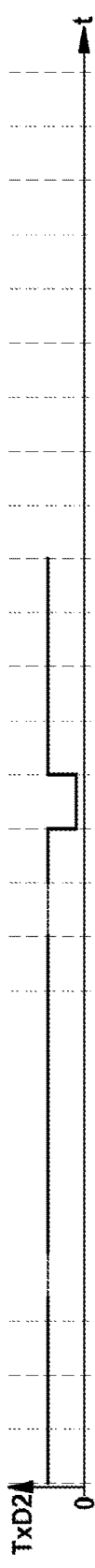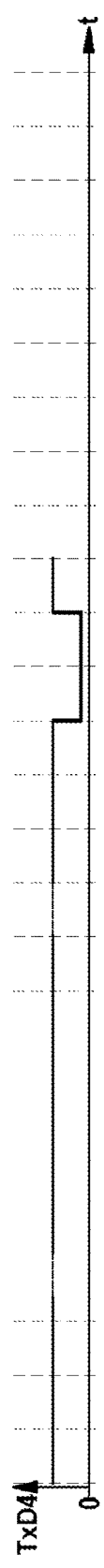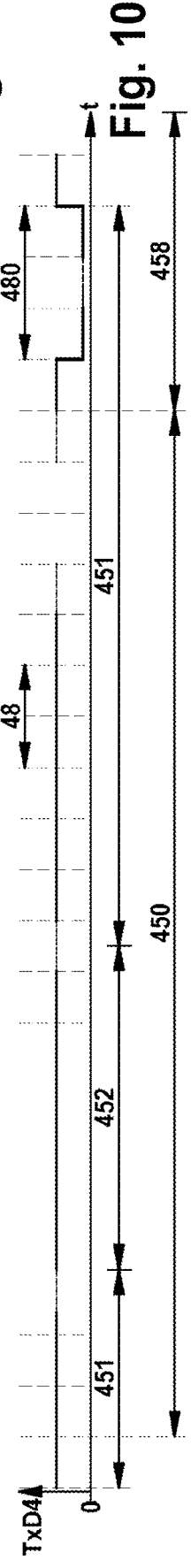

SUBSCRIBER STATION FOR A SERIAL BUS SYSTEM AND METHOD FOR COMMUNICATION IN A SERIAL BUS SYSTEM

FIELD

The present invention relates to a subscriber station for a serial bus system and a method for communication in a serial bus system which operate at a high data rate and with great flexibility and great tolerance to errors, wherein unauthorized manipulations of the operation of a higher-level technical installation is prevented.

BACKGROUND INFORMATION

Bus systems for communication between sensors and control devices, for example in vehicles, are intended to enable the transmission of a large amount of data, depending on the number of functions of a technical installation or of a vehicle. Here it is often required that the data be transmitted from the transmitter to the receiver more quickly than before and that even large data packets can be transmitted if need be.

In the case of vehicles, a bus system is currently being introduced in which data are transmitted as messages in the ISO 11898-1:2015 standard as a CAN protocol specification with CAN FD. The messages are transmitted between the bus subscribers of the bus system, such as sensors, control devices, encoders, etc. CAN FD is used by most manufacturers in the first step with a 2 Mbit/s data bit rate and a 500 kbit/s arbitration bit rate in the vehicle.

In order to make even greater data rates possible, a successor bus system for CAN FD is currently being developed, which is referred to below as CAN XL. In addition to pure data transport via the CAN bus, CAN XL is also intended to support other functions, such as functional safety, data security and quality of service (QoS). These are elementary properties which are required, for example, in an autonomously driving vehicle.

It is very advantageous for CAN XL and CAN FD as well as Classical CAN to be compatible, whereby CAN XL has at least the tolerance to errors such as CAN FD and Classical CAN possess. For compatibility, after completion of arbitration a distinction is drawn between CAN FD and CAN XL frames with the aid of the res bit in the CAN FD frame.

However, it is problematic that in their present design neither CAN FD nor Classical CAN provide any security against manipulation on layer 2 of the OSI layer model. The OSI layer model (OSI=Open Systems Interconnection Model) is a reference model for network protocols which is based on a layer architecture. Network access in relation to frames is regulated in layer 2. As a result of the lack of security in CAN FD and Classical CAN on layer 2, it is possible for manipulated frames, which without authorization change the normal operation of the installation, to be introduced into the bus system. This can lead to undesirable results and possibly to a safety risk for the higher-level technical installation.

SUMMARY

It is an object of the present invention to provide a subscriber station for a serial bus system and a method for communication in a serial bus system which solve the aforementioned problems. In particular, a subscriber station for a serial bus system and a method for communication in a serial bus system are to be provided which offer security against manipulation on layer 2 of the OSI layer model, in order also to realize a safe operation of the bus system as well as a high tolerance to errors in communication, even at a high data rate and with an increase in the amount of payload data per frame.

The object may be achieved by a subscriber station for a serial bus system having the features of the present invention. According to an example embodiment of the present invention, the subscriber station has a communication control device for controlling a communication of the subscriber station with at least one other subscriber station of the bus system and for generating a transmission signal according to a frame, with a transmitting/receiving device which is designed for the serial transmission of a transmission signal generated by the communication control device to a bus of the bus system, and which is designed for the serial reception of signals from the bus of the bus system, and with a marking module for evaluating whether or not a frame received from the bus is permitted to occur on the bus, and for marking a frame with a marking in such a way that the transmitting/receiving device transmits the marking to the bus in order to communicate the result of the evaluation to the at least one other subscriber station of the bus system.

Due to its design, the subscriber station (node) described can non-destructively mark a frame received from the bus as "strange". The marking is executed in such a way that all other subscriber stations (nodes) receive the marking from the bus. The subscriber station can thus inform the other subscriber stations that the frame just transmitted via the bus and marked accordingly should not have been transmitted.

As a result, a subscriber station infected with malware cannot transmit undetected frames that are actually normally transmitted by other nodes. Security in the bus system can thus be increased.

The subscriber station can also be designed to use the marking for other things. In particular, the marking can be used for at least one of the following items of information, namely information regarding the temporal and/or functional use of the frame, information regarding reception of the frame from the bus, or the like.

As a result, even when the amount of payload data per frame is increased the subscriber station can also ensure transmission and reception of the frames with a high level of functional safety and with great flexibility as regards current events during operation of the bus system and with a low error rate.

Here, it is possible with the subscriber station in the bus system, in particular, to maintain in a first communication phase an arbitration from CAN and nevertheless again considerably increase the transmission rate compared to CAN or CAN FD.

According to an example embodiment of the present invention, the method carried out by the subscriber station can also be used if at least one CAN subscriber station and/or at least one CAN FD subscriber station is also present in the bus system, which transmit messages according to the CAN protocol and/or the CAN FD protocol.

Advantageous further embodiments of the subscriber station are disclosed herein.

Optionally, the marking module is designed to mark a frame that is not permitted to occur on the bus.

Optionally, the marking module is designed to evaluate by comparison with a list whether or not a frame received from the bus needs to be marked on the bus.

According to one exemplary embodiment of the present invention, the marking module is designed to insert the marking into the frame without the frame being destroyed.

According to an example embodiment of the present invention, it is possible for the marking module to be designed to insert the marking into the frame after a data field in which payload data of the frame are inserted.

According to an example embodiment of the present invention, it is possible for the marking module to be designed to insert the marking as an inverse bit into the frame at a position that is provided for the subscriber station of the bus system in order to indicate an incorrect reception of the frame, wherein the marking module is designed to insert a marking into the frame that is temporally longer than a temporal length for displaying in the frame the incorrect reception of the frame.

In a variant of the present invention, the marking module is designed to insert the marking into the frame as a marking with a temporal length of N bits, N being a natural number greater than or equal to 1. In this case, the marking module can be designed to select the length of the marking on the basis of the meaning of the marking.

According to one exemplary embodiment of the present invention, the marking module is designed to insert the marking after the frame without the frame being destroyed. In this case, the marking module can be designed to insert the marking after the frame starting at the second bit of an interframe spacing.

Alternatively or additionally, the marking has a greater length than the maximum length of an overload identifier that can be transmitted in the interframe spacing.

The transmitting/receiving device for the serial transmission of a transmission signal generated by the communication control device to a bus of the bus system is possibly designed such that, for one of the frames, the bit time of the signal transmitted to the bus in a first communication phase can differ from a bit time of the signal transmitted in a second communication phase.

It is possible for the frame to be compatible with CAN FD, it being negotiated in a first communication phase which of the subscriber stations of the bus system is to be given an at least temporarily exclusive, collision-free access to the bus in a subsequent second communication phase.

The subscriber station described above can be part of a bus system which additionally comprises a bus and at least two subscriber stations which are connected to one another via the bus in such a way that they can communicate in series with one another. At least one of the at least two subscriber stations is an above-described subscriber station.

The aforementioned object may also achieved by a method for communication in a serial bus system according to the present invention. According to an example embodiment of the present invention, the method is carried out using a subscriber station of the bus system, which comprises a communication control device, a transmitting/receiving device and a marking module, wherein the method comprises the steps of controlling, with the communication control device, a communication of the subscriber station with at least one other subscriber station of the bus system, wherein the communication control device is designed to generate a transmission signal according to a frame; serially transmitting, with the transmitting/receiving device, a transmission signal generated by the communication control device to a bus of the bus system; serially receiving, with the transmitting/receiving device, signals from the bus of the bus system; evaluating, with the marking module, whether or not a frame received from the bus is permitted on the bus; and marking, with the marking module, a frame with a marking in such a way that the transmitting/receiving device transmits the marking to the bus in order to communicate the result of the evaluation to the at least one other subscriber station of the bus system.

The method offers the same advantages as those mentioned above in relation to the subscriber station.

Further possible implementations of the present invention include also not explicitly mentioned combinations of features or embodiments described above or below with respect to the exemplary embodiments. In this case, a person skilled in the art will also add individual aspects as improvements or additions to the relevant basic form of the present invention.

BRIEF DESCRIPTION OF THE DRAWINGS

The present invention is described in more detail below with reference to the figures and on the basis of exemplary embodiments.

FIG. 6 to 9 show an example of transmission signals TxD1 to TxD4, which are generated in four different subscriber stations of the bus system according to the first exemplary embodiment of the present invention during the transmission of a frame.

FIG. 10 shows a time curve of a signal TxD4 at the TXD terminal of a fourth subscriber station of the bus system according to a second exemplary embodiment of the present invention, which subscriber station is currently acting as an RX subscriber station and receives the frame according to the signal in FIG. 6 from the bus of the bus system.

In the figures, identical or functionally identical elements, unless otherwise indicated, are provided with the same reference signs.

DETAILED DESCRIPTION OF EXAMPLE EMBODIMENTS

Figure 1:
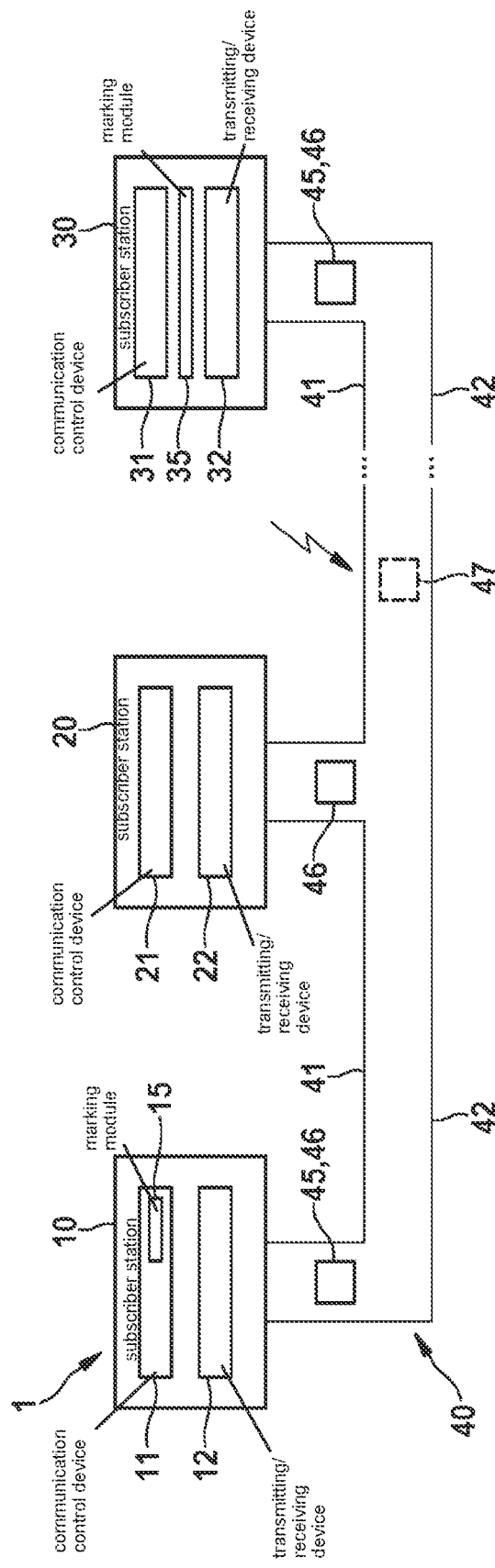
FIG. 1 shows a simplified block diagram of a bus system according to a first exemplary embodiment of the present invention.

FIG. 1 shows an example of a bus system 1, which is in particular fundamentally designed for a CAN bus system, a CAN FD bus system, a CAN XL bus system, and/or modifications thereof, as described below. The bus system 1 can be used in a vehicle, in particular a motor vehicle, an aircraft, etc., or in a hospital, etc.

In FIG. 1, the bus system 1 has a plurality of subscriber stations 10, 20, 30, which are each connected to a bus 40 with a first bus wire 41 and a second bus wire 42. The bus wires 41, 42 can also be referred to as CAN_H and CAN_L or CAN-XL_H and CAN-XL_L and are used for electrical signal transmission after the coupling-in of the dominant levels or the generation of recessive levels or of other levels for a signal in the transmission state. Messages 45, 46 in the form of signals can be transmitted between the individual subscriber stations 10, 20, 30 in series via the bus 40. If an error occurs during communication on the bus 40, as shown by the zig-zag black arrow in FIG. 1, an error frame 47 (error flag) can optionally be transmitted. The subscriber stations 10, 20, 30 are, for example, control devices, sensors, display devices, etc. of a motor vehicle.

As shown in FIG. 1, the subscriber station 10 has a communication control device 11, a transmitting/receiving device 12 and a marking module 15. The subscriber station 20 has a communication control device 21 and a transmitting/receiving device 22. The subscriber station 30 has a communication control device 31, a transmitting/receiving device 32 and a marking module 35. The transmitting/receiving devices 12, 22, 32 of the subscriber stations 10, 20, 30 are each directly connected to the bus 40, even though this is not shown in FIG. 1.

The communication control devices 11, 21, 31 are each used for controlling a communication of the relevant subscriber station 10, 20, 30 via the bus 40 with at least one other subscriber station of the subscriber stations 10, 20, 30 which are connected to the bus 40.

The communication control devices 11, 31 create and read first messages 45, which are, for example, modified CAN messages 45. In this case, the modified CAN messages 45 are structured on the basis of a CAN XL format, which is described in more detail with regard to FIG. 2, and in which the relevant marking module 15, 35 is used. The communication control devices 11, 31 can also be designed to provide, depending on requirements, a CAN XL message 45 or a CAN FD message 46 for the transmitting/receiving device 32 or to receive it from the latter. The communication control devices 11, 31 thus create and read a first message 45 or second message 46, wherein the first and second messages 45, 46 differ in their data transmission standard, namely in this case CAN XL or CAN FD.

The communication control device 21 can be designed as a conventional CAN controller according to ISO 11898-1: 2015, i.e., as a CAN FD-tolerant Classical CAN controller or a CAN FD controller. The communication control device 21 creates and reads second messages 46, for example CAN FD messages 46. In the case of the CAN FD messages 46, a number of from 0 to 64 data bytes can be included, which are in addition transmitted at a significantly faster data rate than in the case of a Classical CAN message. In particular, the communication control device 21 is designed as a conventional CAN FD controller.

The transmitting/receiving device 22 can be designed as a conventional CAN transceiver according to ISO 11898-1: 2015 or a CAN FD transceiver. The transmitting/receiving devices 12, 32 can be designed as required to provide messages 45 according to the CAN XL format or messages 46 according to the current CAN FD format for the associated communication control device 11, 31 or to receive them from the latter.

With the two subscriber stations 10, 30, a formation and then transmission of messages 45 with the CAN XL format and the reception of such messages 45 can be realized.

Figure 2:
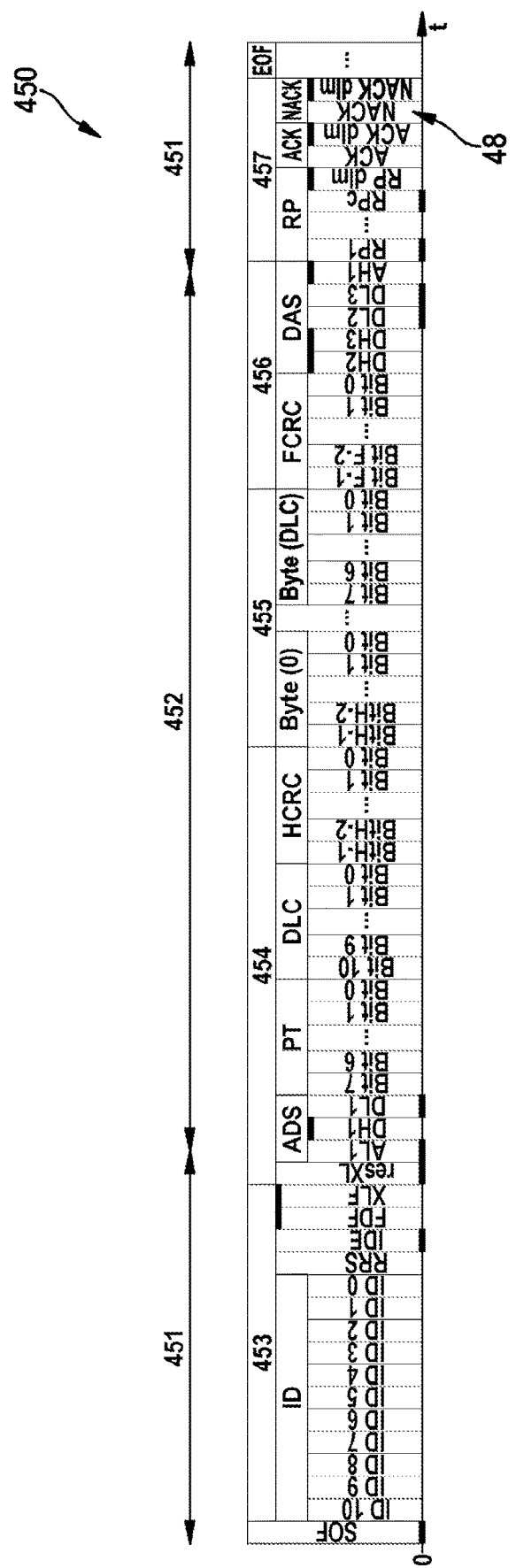
FIG. 2 shows a diagram for illustrating the structure of a message which can be transmitted by a subscriber station of the bus system according to the first exemplary embodiment of the present invention.

FIG. 2 shows a CAN XL frame 450 for the message 45, as is provided by the communication control device 11 for the transmitting/receiving device 12 for transmitting to the bus 40. In this case, the communication control device 11 creates the frame 450 in the present exemplary embodiment as compatible with CAN FD, as also illustrated in FIG. 2.

The same applies analogously to the communication control device 31 and the transmitting/receiving device 32 of the subscriber station 30.

According to FIG. 2, the CAN XL frame 450 is divided for CAN communication on the bus 40 into different communication phases 451, 452, namely an arbitration phase 451 and a data phase 452. The frame 450 has an arbitration field 453, a control field 454, a data field 455, a checksum field 456 for a checksum FCRC and a switchover sequence ADS and a confirmation field 457.

In the arbitration phase 451, with the aid of an identifier (ID) in the arbitration field 453, negotiation takes place bitwise between the subscriber stations 10, 20, 30 as to which subscriber station 10, 20, 30 wishes to transmit the message 45, 46 with the highest priority and will therefore receive exclusive access to the bus 40 of the bus system 1 for the time being for transmitting in the subsequent data phase 452. A physical layer such as in CAN and CAN FD is used in the arbitration phase 451. The physical layer corresponds to the bit transmission layer or layer 1 of the conventional OSI model (Open Systems Interconnection Model).

An important point during the phase 451 is that the conventional CSMA/CR method is used, which allows simultaneous access of the subscriber stations 10, 20, 30 to the bus 40 without the higher-priority message 45, 46 being destroyed. As a result, further bus subscriber stations 10, 20, 30 can be added relatively easily to the bus system 1, which is very advantageous.

The CSMA/CR method implies that there must be so-called recessive states on the bus 40, which can be overwritten by other subscriber stations 10, 20, 30 with dominant states on the bus 40. In the recessive state, high-impedance conditions prevail at the individual subscriber station 10, 20, 30, which in combination with the parasites on the bus circuit results in longer time constants. This leads to a limitation of the maximum bit rate of the present-day CAN-FD physical layer at currently about 2 megabits per second in real vehicle use.

Transmitted in the data phase 452, in addition to a part of the control field 454, are the payload data of the CAN-XL frame or of the message 45 from the data field 455 as well as the checksum field 456 for the checksum FCRC and in addition a field DAS, which is used for switching from the data phase 452 back to the arbitration phase 451.

A transmitter of the message 45 begins to transmit bits of the data phase 452 to the bus 40 only when the subscriber station 10 as the transmitter has won the arbitration and the subscriber station 10 as transmitter thus has exclusive access to the bus 40 of the bus system 1 for transmitting.

Very generally speaking, the following different properties can be implemented in the bus system with CAN XL in comparison with CAN or CAN FD:

a) adopting and optionally adapting proven properties which are responsible for the robustness and user friendliness of CAN and CAN FD, in particular frame structure with identifier and arbitration according to the CSMA/CR method, b) increasing the net data transmission rate, in particular to about 10 megabits per second, c) increasing the size of the payload data per frame, in particular to about 4 kbyte or any other value.

As shown in FIG. 2, in the arbitration phase 451 the subscriber station 10 uses as the first communication phase partially, in particular up to the FDF bit (inclusive), a format from CAN/CAN FD according to ISO11898-1:2015. In contrast, the subscriber station 10 uses a CAN XL format starting with the FDF bit in the first communication phase as well as in the second communication phase, the data phase 452, and this is described below.

In the present exemplary embodiment, CAN XL and CAN FD are compatible. In this case, the res bit from CAN FD, which is referred to below as the XLF bit, is used for switching from the CAN FD format to the CAN XL format. For this reason, the frame formats of CAN FD and CAN XL are the same up until the res bit. A receiver can only identify the format in which the frame is transmitted from the res bit. A CAN XL subscriber station, that is to say in this case the subscriber stations 10, 30, also supports CAN FD.

Alternatively to the frame 450 shown in FIG. 2, in which an identifier with 11 bits is used, a CAN XL extended frame format is optionally possible, in which an identifier with 29 bits is used. Up until the FDF bit, this is identical to the CAN FD extended frame format from ISO11898-1:2015.

According to FIG. 2, the frame 450 of the SOF bit up to and including the FDF bit is identical to the CAN FD base frame format according to ISO 11898-1:2015. For this reason, the structure is not explained further here. Bits that have a fixed value, namely 0 or 1, are marked with a black line. Bits shown with a thick line on their lower line in FIG. 2 are transmitted in the frame 450 as dominant or '0'. Bits shown with a thick line on their upper line in FIG. 2 are transmitted in the frame 450 as recessive or '1'. In the CAN XL data phase 452, symmetrical '1' and '0' levels are used instead of recessive and dominant levels.

In general, two different stuffing rules are applied when generating the frame 450. Up until the XLF bit in the control field 454, the dynamic bit stuffing rule of CAN FD applies, so that after 5 identical bits in succession, an inverse stuff bit is to be inserted. Such stuff bits are also referred to as dynamic stuff bits. After a resXL bit in the control field 454, a fixed stuffing rule applies so that a fixed stuff bit is to be inserted after a fixed number of bits. Alternatively, instead of only one stuff bit, a number of 2 or more bits can be inserted as fixed stuff bits.

In the frame 450, the XLF bit, which corresponds in position to the "res bit" in the CAN FD base frame format, follows directly after the FDF bit, as mentioned above. If the XLF bit is transmitted as 1, i.e. recessively, it thereby identifies the frame 450 as a CAN XL frame. For a CAN FD frame, the communication control device 11 sets the XLF bit as 0, i.e. dominant.

The XLF bit is followed in the frame 450 by a resXL bit, which is a dominant bit for future use. The resXL must be transmitted for the frame 450 as 0, i.e., dominant. However, if the subscriber station 10 receives a resXL bit as 1, that is to say recessive, the receiving subscriber station 10 will enter a protocol exception state, for example, as is carried out in the case of a CAN FD message 46 for a res=1. Alternatively, the resXL bit could be defined exactly inversely, that is to say that it must be transmitted as 1, that is to say recessive. In this case, the receiving subscriber station enters the protocol exception state at a dominant resXL bit.

The resXL bit is followed in the frame 450 by a sequence ADS (arbitration data switch) in which a predetermined bit sequence is encoded. This bit sequence permits a simple and reliable switching from the bit rate of arbitration phase 451 (arbitration bit rate) to the bit rate of the data phase 452 (data bit rate). For example, the bit sequence of the ADS sequence consists, inter alia, of an AL1 bit which is transmitted dominantly, i.e. 0. The AL1 bit is the last bit of the arbitration phase 451. In other words, the AL1 bit is the last bit before the switchover to the data phase 452 with the short bits. Within the AL1 bit, the physical layer in the transmitting/receiving device 12, 22, 32 is switched over. Alternatively, the AL1 bit could have the value 1, depending on which value (0 or 1) is better suited for switching over the physical layer in the transmitting/receiving device 12, 32 (transceiver). The two following bits DH1 and DL1 are already transmitted with the data bit rate. In the case of CAN XL the bits DH1 and DL1 are thus temporally short bits of the data phase 452. If the AL1 bit has the value 1, it will be followed first by the DL1 bit and then the DH1 bit.

After the sequence ADS, a PT field, which identifies the content of the data field 455, follows in the frame 450. The content indicates what type of information is contained in the data field 455. For example, the PT field indicates whether there is an "Internet Protocol" (IP) frame in the data field 455, or a tunneled Ethernet frame or something else.

The PT field is followed by a DLC field, in which the data length code (DLC=data length code) is inserted, indicating the number of bytes in the data field 455 of the frame 450. The data length code (DLC) can assume any value from 0 to the maximum length of the data field 455 or data field length. If the maximum data field length is in particular 2048 bits, the data length code (DLC) will require a number of 11 bits assuming that DLC=0 means a data field length with a number of 1 byte and that DLC=2047 means a data field length with a number of 2048 bytes data field length. Alternatively, a data field 455 of length 0 could be permitted, for example in the case of CAN. Here, DLC=0 would encode the data field length with the number of 0 bytes, for example. The maximum encodable data field length at, for example, 11 bits is then $(2^{11})-1=2047$.

In the example of FIG. 2, the DLC field is followed by a header checksum HCRC in the frame 450. The header checksum HCRC is a checksum for protecting the header of the frame 450; that is to say all relevant bits from the beginning of the frame 450 with the SOF bit until the start of the header checksum HCRC, including all dynamic and optionally the fixed stuff bits up to the beginning of the header checksum HCRC. The relevant bits comprise only those bits of the frame header that have a variable value. In other words, the relevant bits do not include bits that always have a fixed value in the frame 450. Such bits with an invariable value are therefore not protected, since these bits have a fixed value. The length of the header checksum HCRC and thus of the checksum polynomial according to the cyclic redundancy check (CRC) must be selected according to the desired Hamming distance. In the case of a data length code (DLC) of 11 bits, the data word to be protected by the header checksum HCRC is longer than 27 bits. For this reason, the polynomial of the header checksum HCRC must be at least 13 bits long in order to achieve a Hamming distance of 6.

The header checksum HCRC is followed in the frame 450 by the data field 455. The data field 455 consists of 1 to n data bytes, wherein n is, for example, 2048 bytes or 4096 bytes or any other value. Alternatively, a data field length of 0 is possible. The length of the data field 455 is encoded in the DLC field as described above.

The data field 455 is followed by a frame checksum FCRC in the frame 450. The frame checksum FCRC consists of the bits of the frame checksum FCRC. The length of the frame checksum FCRC and thus of the CRC polynomial must be selected according to the Hamming distance desired. The frame checksum FCRC protects the entire frame 450. Alternatively, only the data field 455 is optionally protected with the frame checksum FCRC.

The frame checksum FCRC is followed in the frame 450 by the sequence DAS (data arbitration switch) in which a predetermined bit sequence is encoded. This bit sequence permits a simple and secure switchover from the data bit rate of the data phase 452 to the arbitration bit rate of the arbitration phase 451. For example, the bit sequence begins with the data bits DH2, DH3 that are transmitted as 1 and the data bits DL2, DL3 which are transmitted as 0, as shown in FIG. 2. These are the last 4 bits of the data phase 452. The DL3 bit is thus the last short bit, i.e. the last bit before switching into the arbitration phase 451 with the long bits. The bits are followed by an AH1 bit with the value 1 of the arbitration phase 451. Within the AH1 bit, the physical layer in the transmitting/receiving device 12, 32 (transceiver) is switched over. The AH1 bit could alternatively have the value 0, depending on which value (0 or 1) is better suited for switching over the physical layer in the transmitting/receiving device 12, 32 (transceiver). An RX subscriber station 10, 30 which is only a receiver of the frame 450— that is to say, has not transmitted the received frame 450— uses the bit sequence DH2, DH3, DL2, DL3 not only for synchronization but also as a format check pattern. With this bit sequence, the RX subscriber station 10, 30 can recognize whether it is sampling the bit stream received from the bus 40 in an offset manner, for example by 1 bit or 2 bits, etc. According to yet another example, the DAS field has three bits, i.e. the DH2 bit, the DL2 bit, and an AH1 Bit. Of the bits, the first and last bits are transmitted as 1 and the middle bit is transmitted as 0.

In the above examples, the last synchronization before the switchover from the data phase 452 to the arbitration phase 451 can be carried out at the edge between the DH3 bit and the DL2 bit or between the DH2 bit and the DL2 bit in the receiving subscriber station.

After the sequence DAS, the confirmation field 457, which begins with an RP field, follows in the frame 450. The RP field contains a synchronization pattern (sync pattern) which allows a receiving subscriber station 10, 30 to recognize the start of the arbitration phase 451 after the data phase 452. The synchronization pattern allows receiving subscriber stations 10, 30 which, for example, do not know the correct length of the data field 455 due to an incorrect header checksum HCRC, to synchronize themselves. These subscriber stations can then transmit a "negative acknowledge" in order to report erroneous reception. This is particularly important when CAN XL does not allow error frames 47 (error flags) in the data field 455.

After the RP field, a plurality of bits follow in the confirmation field (ACK field) 457 for confirmation or non-confirmation of a correct reception of the frame 450. In the example of FIG. 2, an ACK bit, an ACK dlm bit, a NACK bit, and a NACK dlm bit are provided. The receiving subscriber stations 10, 30 transmit the ACK bit as dominant if they have received the frame 450 correctly. The transmitting subscriber station transmits the ACK bit as recessive. For this reason, the bit originally transmitted to the bus 40 in the frame 450 can be overwritten by the receiving subscriber stations 10, 30. The ACK dlm bit is transmitted as a recessive bit, which is used for separation from other fields. The NACK bit and the NACK dlm bit are used to enable a receiving subscriber station to signal an incorrect reception of the frame 450 on the bus 40. The function of the NACK dlm bit is the same as that of the ACK dlm bit. The NACK bit may be used to mark the frame 450, as described below.

The confirmation field (ACK field) 457 is followed in the frame 450 by an end field (EOF=end of frame). The bit sequence of the end field (EOF) is used to mark the end of the frame 450. The end field (EOF) ensures that a number of 8 recessive bits is transmitted at the end of the frame 450. This is a bit sequence that cannot occur within the frame 450. As a result, the end of the frame 450 can be reliably detected by the subscriber stations 10, 20, 30.

The end field (EOF) has a length which differs depending on whether a dominant bit or a recessive bit has been seen in the NACK bit. If the transmitting subscriber station has received the NACK bit as dominant, the end field (EOF) will have a number of 7 recessive bits. Otherwise, the end field (EOF) will only be 5 recessive bits long.

The end field (EOF) is followed in the frame 450 by an interframe spacing 458 (INT—intermission field), which is not shown in FIG. 2, but only in FIG. 9 and FIG. 10. This interframe spacing 458 (INT) is configured as in CAN FD according to ISO11898-1:2015.

Figure 3:
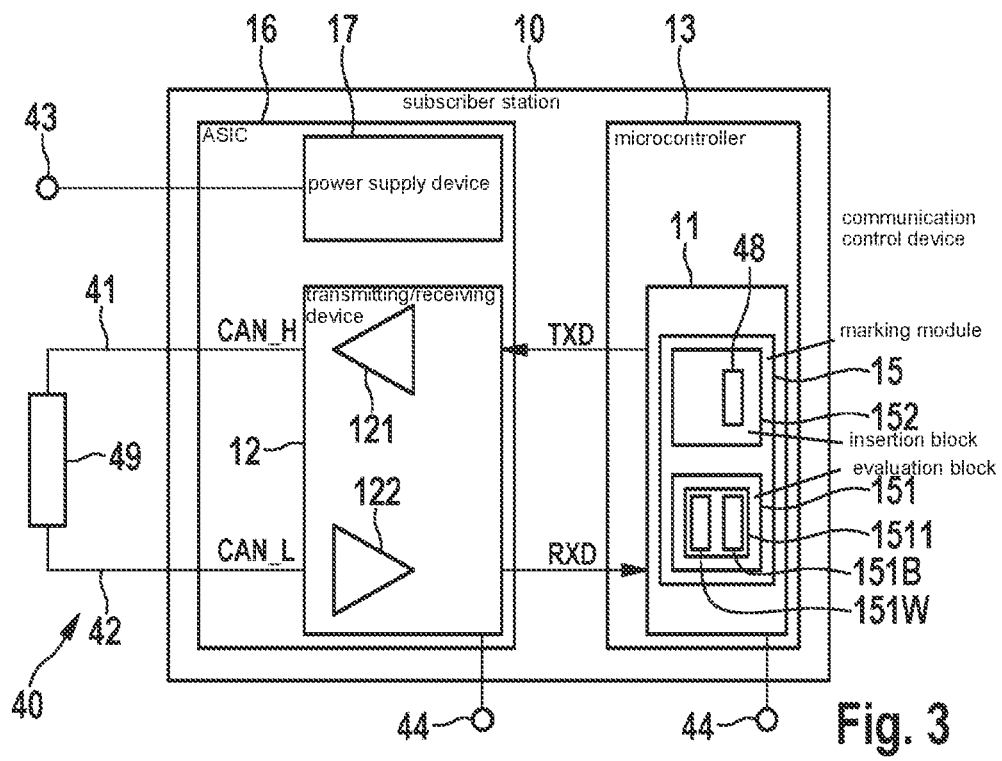
FIG. 3 shows a simplified schematic block diagram of a subscriber station of the bus system according to the first exemplary embodiment of the present invention.

FIG. 3 shows the basic structure of the subscriber station 10 with the communication control device 11, the transmitting/receiving device 12 and the marking module 15, which is part of the communication control device 11. The subscriber station 30 is constructed in a similar manner, as shown in FIG. 3, but the marking module 35 according to FIG. 1 is arranged separately from the communication control device 31 and the transmitting/receiving device 32. For this reason, the subscriber station 30 is not described separately.

According to FIG. 3, the subscriber station 10 has, in addition to the communication control device 11 and the transmitting/receiving device 12, a microcontroller 13 to which the communication control device 11 is assigned, and a system ASIC 16 (ASIC=application-specific integrated circuit), which can alternatively be a system basis chip (SBC), on which a plurality of functions necessary for an electronic module of the subscriber station 10 are combined. In the system ASIC 16, a power supply device 17 which supplies the transmitting/receiving device 12 with electrical energy is installed in addition to the transmitting/receiving device 12. The power supply device 17 usually supplies a voltage CAN_supply of 5 V. Depending on requirements, however, the power supply device 17 can provide a different voltage with a different value. Additionally or alternatively, the power supply device 17 can be designed as a current source.

The marking module 15 has an evaluation block 151 and an insertion block 152, which are described in more detail below.

The transmitting/receiving device 12 also has a transmitting module 121 and a receiving module 122. Although reference is always made to the transmitting/receiving device 12 below, it is alternatively possible to provide the receiving module 122 in a separate device externally from the transmitting module 121. The transmitting module 121 and the receiving module 122 can be constructed as in a conventional transmitting/receiving device 22. The transmitting module 121 can in particular have at least one operational amplifier and/or a transistor. The receiving module 122 can in particular have at least one operational amplifier and/or a transistor.

The transmitting/receiving device 12 is connected to the bus 40, put more precisely its first bus wire 41 for CAN_H or CAN-XL_H and its second bus wire 42 for CAN_L or CAN-XL_L. The voltage supply for the power supply device 17 for supplying the first and second bus wires 41, 42 with electrical energy, in particular with the voltage CAN-Supply, is effected via at least one terminal 43. The connection to ground or CAN_GND is realized via a terminal 44. The first and second bus wires 41, 42 are terminated with a terminating resistor 49.

In the transmitting/receiving device 12, the first and second bus wires 41, 42 are not only connected to the transmitting module 121, which is also referred to as a transmitter, but also to the receiving module 122, which is also referred to as a receiver, although the connections in FIG. 3 are not shown for the sake of simplicity.

Figure 4:
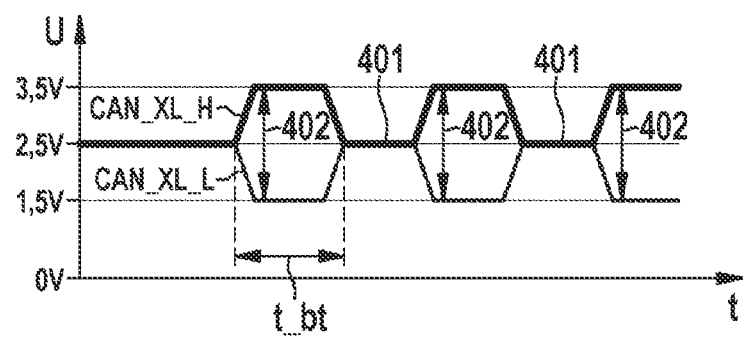
FIG. 4 shows a time curve of bus signals CAN-XL_H and CAN-XL_L in the case of the subscriber station according to the first exemplary embodiment of the present invention.

During operation of the bus system 1, the transmitting module 121 converts a transmission signal TXD or TxD of the communication control device 11 into corresponding signals CAN-XL_H and CAN-XL_L for the bus wires 41, 42 and transmits these signals to the bus 40 at the terminals for CAN_H and CAN_L. An example of the signals CAN-XL_H and CAN-XL_L is shown in FIG. 4. A difference signal VDIFF=CAN-XL_H−CAN-XL_L, which is shown in FIG. 5, is formed on the bus 40.

Figure 5:
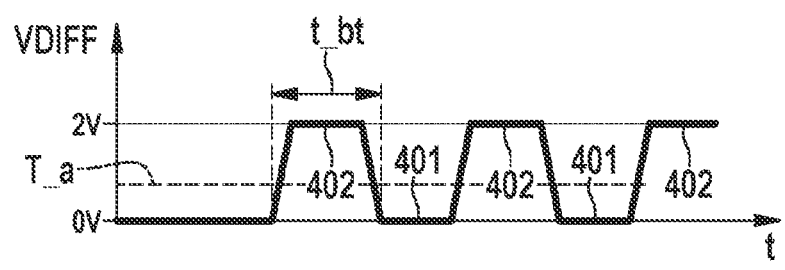
FIG. 5 shows a time curve of a differential voltage VDIFF of the bus signals CAN-XL_H and CAN-XL_L in the case of the subscriber station according to the first exemplary embodiment of the present invention.

The receiving module 122 of FIG. 3 forms a reception signal RXD or RxD from signals CAN-XL_H and CAN-XL_L received from the bus 40 according to FIG. 4 or from the difference signal VDIFF according to FIG. 5. As shown in FIG. 3, the receiving module 122 forwards the received signal RXD or RxD to the communication control device 11.

With the exception of an idle or standby state, in normal operation the transmitting/receiving device 12, with the receiving module 122, constantly listens for a transmission of data or messages 45, 46 on the bus 40, regardless of whether or not the transmitting/receiving device 12 is the transmitter of the message 45.

According to the example of FIG. 4, the signals CAN-XL_H and CAN-XL_L have the dominant and recessive bus levels 401, 402, as provided in CAN, at least in the arbitration phase 451. The individual bits of the signal VDIFF with the bit time t_bt can be detected with the receiving module 122 with a reception threshold T_a of, for example, 0.7 V in the arbitration phase 451, as shown in FIG. 5. In the data phase 452, the bits of the signals CAN-XL_H and CAN-XL_L are transmitted faster, that is to say with a shorter bit time t_bt, than in the arbitration phase 451. The signals CAN-XL_H and CAN-XL_L thus differ in the data phase 452 from the conventional signals CAN_H and CAN_L, at least in terms of their faster bit rate. If the signals CAN-XL_H and CAN-XL_L are also generated in the data phase 452 with a different physical layer, the reception threshold will be switched in the receiving module 122 as well, for example to a reception threshold T d of approximately 0.0 V in the data phase 452.

The sequence of states 401, 402 for the signals CAN-XL_H, CAN-XL_L in FIG. 4 and the resulting curve of the voltage VDIFF of FIG. 5 serves only to illustrate the function of the subscriber station 10. The sequence of the data states for the bus states 401, 402 can be selected as required.

In other words, in a first mode of operation according to FIG. 4, the transmitting module 121 of FIG. 3 generates a first data state as a bus state 402 with different bus levels for two bus wires 41, 42 of the bus line and a second data state as a bus state 401 with the same bus level for the two bus wires 41, 42 of the bus line of the bus 40. In addition, in a second operating mode which comprises the data phase 452, for the time curves of the signals CAN-XL_H, CAN-XL_L the transmitting module 121 of FIG. 3 transmits the bits at a higher bit rate to the bus 40. As mentioned, the signals CAN-XL_H, CAN-XL_L in the data phase 452 can also be generated with a different physical layer than in the case of CAN FD. As a result, the bit rate in the data phase 452 can be increased even further than in the case of CAN FD.

The marking module 15 of FIG. 3, in particular its evaluation block 151, is used to evaluate whether or not the frame 450 currently received is to be marked. For this purpose, the evaluation block 151 has a reception filter 1511 with which predetermined frames 450 can be filtered out.

For this purpose, the reception filter 1511 has filter criteria 151B, with which it can be determined whether the frame 450 has properties that must not occur on the bus 40. The filter criteria 151B are established on the basis of features which represent a security risk for the bus system 1. In particular, the filter criteria 151B are stored as a list, so that the evaluation block 151 carries out a comparison with the list. Such a list can be referred to as a security feature black list. In particular, the list can have identifiers ID for which the transmission of predetermined frames 450 with predetermined content is not permissible. For example, a sensor having a special identifier may not transmit a frame 450 which is usually expected from a control device or another sensor or an encoder or a drive device. Here, any variants are possible and can be stored in the list or in the filter criteria 151B. For example, the black list of the subscriber station 10 contains all those identifiers ID that may only be transmitted exclusively by the subscriber station 10. This means that if the subscriber station 10 receives a message or frame 450 from the bus 40 and the reception filter 1511 with the filter criteria 151B finds such a property (hit) that is not allowed to occur on the bus 40, this will be a message or frame 450 that is not permitted on the bus 40.

In addition, the reception filter 1511 has filter criteria 151W with which it can be determined whether the frame 450 is of interest for the subscriber station 10. The list thus corresponds to a so-called acceptance filter. In particular, the filter criteria 151W are stored as a list. Such a list can be referred to as a white list.

The subscriber station 10 uses the reception filter 1511 in particular in a case in which the subscriber station 10 is not a transmitter of the frame 450 currently being transmitted on the bus 40, i.e. it is acting as an RX subscriber station.

If the subscriber station 10 as an RX subscriber station recognizes, with the evaluation block 151, more precisely its reception filter 1511 using the filter criteria 151B, that the frame 450 which is just now still being transmitted on the bus 40 is not permitted to occur there, the evaluation block 15 will signal this to the insertion block 152. In particular, the evaluation block 15 in this case instructs the insertion block 152 to mark the frame 450 on the bus 40 with a marking 48. In other words, in the case mentioned, the RX subscriber station (receiving node) can instruct its communication control device 11, in particular the CAN XL protocol controller, to mark the frame 450 on the bus 40 with a marking 48.

For this purpose, the communication control device 11, in particular the CAN XL protocol controller, transmits in the frame 450 N dominant bits in the NACK field. The dominant bits overwrite the NACK bit. N is ideally 2 because the NACK bit will be 1 bit long if it is transmitted. Alternatively, the insertion block 152 can be designed to distinguish between several different markings 48, in particular a marking 48 with N=2 bits, a marking 48 with N=3 bits and optionally additionally a marking 48 with N=4 bits. Of course, other examples are possible. If the insertion block 152 can differentiate different markings 48, the different markings 48 will have different meanings. The different markings 48 each overwrite the other. The reason for this is that the number of bits of the markings 48 and thus the length of the markings 48 is different. Alternatively, if no NACK bit is required in the bus system 1, a marking 48 with N=1 bit length can be made.

After marking a received frame 450 with the insertion block 152, all other subscriber stations 20, 30 on the bus 40 will see that at least one subscriber station is of the opinion that this frame 450 on the bus 40 is "strange", in other words it does not fit into a predetermined pattern and possibly represents or could represent a security risk. Each of the subscriber stations 10, 30 on the bus 40 can treat this marked frame 450 in a particular way.

For example, one of the subscriber stations 10, 30, in particular its communication control device 11, 31 (protocol controller) can be designed to discard the marked frame 450, although it had been received error-free.

Alternatively, one of the subscriber stations 10, 30, in particular its communication control device 11, 31 (protocol controller) can be designed to transition into a kind of emergency run, since such an event, a frame 450 marked with the marking 48, should never occur. Nevertheless, if such an event should occur, namely a frame 450 marked with the marking 48, most likely there is malware on one of the control devices of the subscriber stations 10, 30 on the bus 40. Such malware attempts to manipulate the behavior of the higher-level technical installation, in particular of a vehicle, by the malware transmitting frames 450 which only other subscriber stations 10, 20, 30 on the bus 40 are actually allowed to transmit. Alternatively, such an event can occur, namely a marked frame 450, if a misconfiguration of a control device has occurred. In such a case, this can lead to the same effect, namely a marked frame 450.

The marking 48 of a received frame 450 with the insertion block 152 may also help in detecting misconfiguration(s).

FIGS. 6 to 9 show an example of transmission signals TxD which occur in four different subscriber stations 10 of the bus system 1 during and after the transmission of a frame 450 at the terminal TXD of the individual subscriber stations 10, 10, 10, 10. This means that it is assumed below that the bus system 1 has at least four subscriber stations 10 of identical construction. Of course, at least one of the subscriber stations 10 can have an alternative construction, such as a subscriber station 30.

FIG. 6 shows a time curve of a transmission signal TxD1 at the TXD terminal of a first subscriber station 10 of the bus system 1, which is currently transmitting a frame 450 to the bus 40 and is thus acting as a TX subscriber station;

FIG. 7 shows a time curve of a transmission signal TxD2 at the TXD terminal of a second subscriber station 10 of the bus system 1, which is currently acting as an RX subscriber station and is receiving the frame 450 according to the signal of FIG. 6 from the bus 40;

FIG. 8 shows a time curve of a transmission signal TxD3 at the TXD terminal of a third subscriber station 10 of the bus system 1, which is currently acting as an RX subscriber station and is receiving the frame 450 according to the signal of FIG. 6 from the bus 40;

FIG. 9 shows a time curve of a signal TxD4 at the TXD terminal of a fourth subscriber station 10 of the bus system 1, which is currently acting as an RX subscriber station and is receiving the frame according to the signal of FIG. 6 from the bus of the bus system.

The first subscriber station 10 is thus transmitting a frame 450 to the bus 40 with the transmission signal TxD1 according to FIG. 6. The frame 450 is received by the other subscriber stations 10. The frame 450 is transmitted in the arbitration phase 451 with bits with a first bit duration t_b1. In the data phase 452, the frame 450 is transmitted with bits with a second bit duration t_b2. The second bit duration t_b2 is shorter than the first bit duration t_b1, as described above.

The second subscriber station 10 has received the frame 450 correctly and confirms this with an ACK, as shown in FIG. 7 in the transmission signal TxD2.

In contrast, the third subscriber station 10 has not received the frame 450 correctly. The third subscriber station 10 therefore confirms the reception of the frame 450 with a NACK, as shown in FIG. 8 in the transmission signal TxD3. The NACK is inserted into the frame 450 as an inverse bit. In other words, the NACK is inserted as a value inverse to the value of the bit that was transmitted in the transmission signal TxD1.

In addition, the fourth subscriber station 10 has classified the frame 450 as a "strange" frame 450. The fourth subscriber station 10 therefore marks the frame 450 with its marking module 15 with a marking 48, as described above with reference to FIGS. 3 to 5. For this purpose, the subscriber station 10 transmits a transmission signal TxD4 with a marking 48 in the bits NACK and NCK dlm, as shown in FIG. 9. In the example of FIG. 9, the marking 48 has two dominant bits. Thus, n=2. In addition, the marking 48 is inserted into the frame 450 for the NACK and NCK dlm as inverse bits. In other words, the marking 48 is inserted as a value inverse to the value of the bits NACK and NCK dlm, which was transmitted in the transmission signal TxD1.

As a result of the marking 48, which all subscriber stations 10 receive in their received signal RxD and thus see, the three RX subscriber stations 10, that is to say the second to fourth subscriber stations 10, proceed according to one of the options described above in order to respond to the frame 450. The selected option in the response to the marking 48, more precisely the frame 450, can be set in a fixed manner ex-works or may have been previously set in the configuration of the relevant subscriber station 10.

According to the first exemplary embodiment, the marking module 15, in particular the insertion block 152, is designed to overwrite the bit NACK as a marking 48 with N bits in order to carry out the marking 48 of the frame 450. Here, N is a natural number greater than or equal to 1.

According to a modification of the first exemplary embodiment, the marking module 15, in particular the insertion block 152, is designed to also carry out a kind of arbitration during the superimposition. For this purpose, the subscriber station 10 proceeds as follows.

The subscriber station 10, which has transmitted a NACK, as shown in FIG. 8, checks whether its NACK has been overwritten. If the NACK has been overwritten, the subscriber station 10 will transmit its NACK again after the marking 48.

In the bus system 1 according to the first exemplary embodiment and its above-described variants and modifications, it can thus be reliably recognized and communicated to the other bus subscribers when a "strange" frame 450 is transmitted in the bus system 1. In the case of a high data transmission rate, data security in operation of the bus system 1 can thus be increased in comparison with the related art. As a result, security in the operation of the higher-level technical installation, in particular of a vehicle or an industrial installation, or of another technical installation, can also be increased in comparison with the related art.

FIG. 10 shows a kind of marking 480 of a "strange" frame 450 according to a second exemplary embodiment. At least one of the subscriber stations 10, 30 can be designed to carry out the marking 480 as an alternative or in addition to a marking 48 according to the preceding embodiment. In the following, for the sake of simplicity, reference is made only to the subscriber station 10, even though the following description can be used analogously in the case of the subscriber station 30.

In contrast to the first exemplary embodiment, the marking module 15, in particular the insertion module 152, is designed to insert a marking 480 after the frame 450. The marking 480 is thus not transmitted in the frame 450. For this reason, the NACK bit and the NACK dlm bit may be optional bits. If the NACK bit and the NACK dlm bit are present, the function of the bits NACK, NACK dlm in the present exemplary embodiment is the same as the function of the ACK bit and the ACK dlm bit.

In the present exemplary embodiment, the marking 480 begins in the interframe spacing 458 (INT). The interframe spacing 458 (INT) has a minimum of 3 bits in the case of CAN.

The marking module 15 is thus designed to insert the marking 480 in particular directly after the frame 450. In the example of FIG. 10, the marking 480 is inserted starting with bit 2 of the interframe spacing 458 (INT). Each of the subscriber stations 10, 30, in particular their communication control device 11, 31, more precisely their protocol controller, is thus designed in such a way that it also looks to see whether or not a marking 480 is present in the interframe spacing 458 (INT) even after the end of the frame 450 has been received. As a result, the subscriber station 10, 20, 30, in particular its communication control device 11, 31, more precisely its protocol controller, can determine whether the previously received frame 450 has been classified by any of the subscriber stations 10, 30 as a "strange" frame 450.

In the example of FIG. 10, the insertion block 152 has inserted a marking 480 (overload flag), which has a length M=8 bits, into the transmission signal TxD4 in the interframe spacing 458 (intermission field). Since two markings 480 (overload flags) cannot be superimposed on this length M=8 bits, the kind of marking 480 is a variant to mark a "strange" frame 450 in a non-destructive manner. Any other length M which cannot result from the superimposition of markings 480 (overload flags) is also possible. A normal overload flag has the length of 6 bits.

Moreover, the modules 15, 35 are constructed in the same way as described above for the first exemplary embodiment or one of the modifications thereof.

All above-described embodiments of the subscriber stations 10, 20, 30, of the bus system 1 and the method executed therein can be used individually or in all possible combinations. In particular, all features of the above-described exemplary embodiments and/or their modifications can be combined as desired. Additionally or alternatively, the following modifications are possible in particular.

It is possible for at least one of subscriber stations 10, 30, in particular its communication control device 11, 31, more precisely its protocol controller, to be able to recognize only a marking 48 or a marking 480 for a frame. In this way, a distinction can be made between the meanings of the markings 48, 480. In addition, this at least one of the subscriber stations 10, 20, 30, in particular its communication control device 11, 21, 31, more precisely its protocol controller, has fewer possibilities for differentiating a response to the markings 48, 480.

Alternatively or additionally, it is possible for at least one of the subscriber stations 10, 20, 30, in particular its communication control device 11, 21, 31, more precisely its protocol controller, to be able to differentiate between only some of the meanings of the markings 48, 480. As a result, this at least one of the subscriber stations 10, 20, 30, in particular its communication control device 11, 21, 31, more precisely its protocol controller, has fewer differentiation possibilities for a response to the markings 48, 480.

It is also possible for the TX subscriber station, which receives from the bus 40 the frame 450 transmitted by it on the bus 40, to insert a marking 48 or 480 into the frame 450 when the TX subscriber station detects a strange frame in the frame 450, which is received instead of the expected frame 450 (corresponding to the transmitted frame 450). This can be the case, in particular, when malware inserts markings 48, 480 that the TX subscriber station classifies as "strange". Even if the associated subscriber station 10, 30 is an RX subscriber station and therefore only a receiver of the frame in the running data phase 452, such malware can, for example, transmit something to the bus 40 not only in the NACK bit but also elsewhere in the frame 450 itself, and thus corrupt the frame 450 transmitted by the TX subscriber station to the bus 40. The TX subscriber station can detect this and thus already provide the frame 450 with at least one corresponding marking 48, 480. Additionally or alternatively, the malware can even be active in the TX subscriber station and transmit corrupted messages. The marking module 15, which ideally cannot be manipulated by the malware, inserts at least one of the markings 48, 480 when needed or in such a case.

Even though the present invention is described above using the example of the CAN bus system, the present invention can be used in any communication network and/or communication method in which two different communication phases are used in which the bus states generated for the different communication phases are different. In particular, the present invention can be used in developments of other serial communication networks, such as Ethernet and/or 10 Base-T1 S Ethernet, fieldbus systems, etc.

In particular, the bus system 1 according to the exemplary embodiments can be a communication network in which data can be transmitted in series at two different bit rates. It is advantageous, but not necessarily a prerequisite, for an exclusive, collision-free access of a subscriber station 10, 20, 30 to a common channel to be ensured for the bus system 1, at least for certain time periods.

The number and arrangement of the subscriber stations 10, 20, 30 in the bus system 1 of the exemplary embodiments is arbitrary. In particular, the subscriber station 20 in the bus system 1 can be omitted. It is possible for one or more of the subscriber stations 10 or 30 to be present in the bus system 1. It is possible for all subscriber stations in the bus system 1 to be configured identically, that is to say only the subscriber station 10 or only subscriber station 30 are present.

What is claimed is:

1. A subscriber station for a serial bus system, comprising:
   a communication control device configured to control a communication of the subscriber station with at least one other subscriber station of the bus system and to generate a transmission signal according to a frame;
   a transmitting/receiving device configured to serially transmit the transmission signal generated by the communication control device to a bus of the bus system, and configured to serially receive signals from the bus; and
   a marking module configured to evaluate whether or not a frame received from the bus is permitted to occur on the bus, and configured to mark the received frame with a marking in such a way that the transmitting/receiving device transmits the marking to the bus to communicate a result of the evaluation to the at least one other subscriber station of the bus system, wherein:

the marking module is configured to insert the marking as an inverse bit into the received frame at a position provided for the subscriber station of the bus system to indicate an incorrect reception of the received frame, and the marking module configured to insert the marking into the received frame that is temporally longer than a temporal length for indicating the incorrect reception of the received frame in the received frame.

2. The subscriber station according to claim 1, wherein the marking module is configured to mark the received frame based on the received frame not being permitted to occur on the bus.

3. The subscriber station according to claim 1, wherein the marking module is configured to perform the evaluation of whether or not the received frame must be marked by comparison with a list.

4. The subscriber station according to claim 1, wherein the marking module is configured to insert the marking into the received frame without the received frame being destroyed.

5. The subscriber station according to claim 1, wherein the marking module is configured to insert the marking into the received frame after a data field in which payload data of the received frame are inserted.

6. The subscriber station according to claim 1, wherein the marking module is configured to insert the marking into the received frame as a marking with a temporal length of N bits, wherein N is a natural number greater than or equal to 1.

7. The subscriber station according to claim 6, wherein the marking module is configured to select the length of the marking depending on a meaning of the marking.

8. The subscriber station according to claim 1, wherein the marking module is configured to insert the marking after the received frame without the received frame being destroyed.

9. A subscriber station for a serial bus system, comprising:
a communication control device configured to control a communication of the subscriber station with at least one other subscriber station of the bus system and to generate a transmission signal according to a frame;
a transmitting/receiving device configured to serially transmit the transmission signal generated by the communication control device to a bus of the bus system, and configured to serially receive signals from the bus; and
a marking module configured to evaluate whether or not a frame received from the bus is permitted to occur on the bus, and configured to mark the received frame with a marking in such a way that the transmitting/receiving device transmits the marking to the bus to communicate a result of the evaluation to the at least one other subscriber station of the bus system, wherein the marking module is configured to insert the marking after the received frame without the received frame being destroyed, wherein the marking module is configured to insert the marking after the received frame beginning with a second bit of an interframe spacing.

10. The subscriber station according to claim 9, wherein the marking has a greater length than a maximum length of an overload identifier that can be transmitted in the interframe spacing.

11. A subscriber station for a serial bus system, comprising:
a communication control device configured to control a communication of the subscriber station with at least one other subscriber station of the bus system and to generate a transmission signal according to a frame;
a transmitting/receiving device configured to serially transmit the transmission signal generated by the communication control device to a bus of the bus system, and configured to serially receive signals from the bus; and
a marking module configured to evaluate whether or not a frame received from the bus is permitted to occur on the bus, and configured to mark the received frame with a marking in such a way that the transmitting/receiving device transmits the marking to the bus to communicate a result of the evaluation to the at least one other subscriber station of the bus system, wherein the transmitting/receiving device is configured to serially transmit the transmission signal generated by the communication control device to the bus of the bus system such that, for the frame, the bit time of a signal transmitted to the bus in a first communication phase can differ from a bit time of a signal transmitted in a second communication phase.

12. A subscriber station for a serial bus system, comprising:
a communication control device configured to control a communication of the subscriber station with at least one other subscriber station of the bus system and to generate a transmission signal according to a frame;
a transmitting/receiving device configured to serially transmit the transmission signal generated by the communication control device to a bus of the bus system, and configured to serially receive signals from the bus; and
a marking module configured to evaluate whether or not a frame received from the bus is permitted to occur on the bus, and configured to mark the received frame with a marking in such a way that the transmitting/receiving device transmits the marking to the bus to communicate a result of the evaluation to the at least one other subscriber station of the bus system, wherein the frame is constructed to be compatible with CAN FD, and wherein in a first communication phase it is negotiated which of the subscriber stations of the bus system will be given an at least temporarily exclusive, collision-free access to the bus in a subsequent second communication phase.

13. A bus system, comprising:
a bus; and
at least two subscriber stations which are connected to one another via the bus in such a way that they can communicate in series with one another and of which at least one subscriber station includes:
a communication control device configured to control a communication of the subscriber station with at least one other subscriber station of the bus system and to generate a transmission signal according to a frame;
a transmitting/receiving device configured to serially transmit the transmission signal generated by the communication control device to the bus of the bus system, and configured to serially receive reception signals from the bus; and
a marking module configured to evaluate whether or not a frame received from the bus is permitted to occur on the bus, and configured to mark the frame with a marking in such a way that the transmitting/receiving device transmits the marking to the bus to communicate a result of the evaluation to the at least one other subscriber station of the bus system, wherein:

the marking module is configured to insert the marking as an inverse bit into the received frame at a position provided for the subscriber station of the bus system to indicate an incorrect reception of the received frame, and the marking module configured to insert the marking into the received frame that is temporally longer than a temporal length for indicating the incorrect reception of the received frame in the received frame.

14. A method for communication in a serial bus system, wherein the method is carried out with a subscriber station of the bus system which has a communication control device, a transmitting/receiving device, and a marking module, the method comprising the following steps:

controlling, with the communication control device, a communication of the subscriber station with at least one other subscriber station of the bus system, wherein the communication control device is configured to generate a transmission signal according to a frame;

serially transmit, with the transmitting/receiving device, the transmission signal generated by the communication control device to a bus of the bus system;

serially receiving, with the transmitting/receiving device, signals from the bus of the bus system, evaluating, with the marking module, whether or not a frame received from the bus is permitted to occur on the bus; and marking, with the marking module, the received frame with a marking in such a way that the transmitting/receiving device transmits the marking to the bus in order to communicate a result of the evaluation to the at least one other subscriber station of the bus system, wherein:

the marking module is configured to insert the marking as an inverse bit into the received frame at a position provided for the subscriber station of the bus system to indicate an incorrect reception of the received frame, and the marking module configured to insert the marking into the received frame that is temporally longer than a temporal length for indicating the incorrect reception of the received frame in the received frame.

\* \* \* \* \*